Patented Feb. 12, 1935

1,990,676

UNITED STATES PATENT OFFICE 1,990,676

COSMETIC CREAM

Louis J. Stern, Yonkers, N. Y.

No Drawing. Application November 21, 1931,
Serial No. 576,616

4 Claims. (Cl. 167—91)

My invention relates to cosmetic preparations and refers particularly to stabilized cosmetic creams containing natural citrus fruit juice.

While I do not limit myself to any particular citrus fruit juice, as I may employ any such juices among which are those of oranges, grapefruit, lemons, I have found that my products are particularly valuable as cosmetics when they contain natural lemon juice.

The advantageous and beneficial attributes of natural lemon juice have been recognized for many years, among which desirable properties are its astringent, cleansing and bleaching effects when applied to the human skin.

It has not been found possible, however, to incorporate natural lemon juice and other citrus fruit juice into the ordinarily employed emolient oil, fat and wax emulsions, as such mixtures are not stable, but break down into their constituents after a period of rest, and hence are unsuitable for cosmetic creams, in which the emulsion effect must be preserved even after a considerable period of time.

Because of the afore-mentioned, and other, reasons it has been thought impossible to produce an emulsion, or mixture of these juices and especially lemon juice with an emolient; which would remain in a stabilized condition free from component separations for a considerable length of time.

All of the previously employed emolients are of an alkaline character and thus incompatible with acid natural fruit juices such as lemon juice, and I have found means whereby a stabilized acid emulsion containing lemon juice and the other citrus fruit juices may be obtained, thus producing a new and valuable product for cosmetic purposes.

I have found that these natural citric fruit juices can be mixed with the compounds produced by mild oxidation of cholesterin and cholesterin containing substances, among which are those compounds known as oxy-cholesterin and meta-cholesterin and mixtures thereof, even in large proportion, to form an emulsion, or mixture, in which there is no aqueous phase separation for a very considerable length of time, thus allowing the commercialization of the product.

I give the following as examples of the following of my process:—

1. Five parts oxy-cholesterin and 95 parts petrolatum are thoroughly mixed to form a base. Twenty parts of petrolatum and three parts beeswax are melted together, and thirty parts of above base added with thorough stirring. Fifty parts of natural lemon juice are added to the above mixture while still hot and stirring continued until the mass is cool. The emulsion thus formed is stable and will exhibit no aqueous phase separation even upon standing for a considerable length of time.

2. The natural lemon juice mentioned in the foregoing example may be replaced by grapefruit juice.

Water may be added to the natural citrus fruit juices if desired.

The petroleum mentioned in the above example may be substituted by other suitable petroleum hydrocarbons, mineral oil and other emolients, and the mentioned beeswax may be omitted or replaced by other waxes, spermacite &c.

If desired, preservatives such as benzoic acid, methyl ester of para-hydroxy benzoic acid, or its salts may be added.

By stabile, or stabilized, cosmetic creams, I mean those creams or pastes adapted for cosmetic purposes which do not exhibit an aqueous phase separation even upon standing for a considerable length of time.

The products of my invention are new and valuable and represent a great advance in the industry to which they appertain, in that they are means whereby a stabilized emulsion of an emolient and natural citric fruit juices can be safely commercialized and, hence, whereby the valuable properties of these juices are obtainable in the form of a cosmetic cream.

I do not limit myself to the particular quantity, materials or steps of procedure specifically mentioned as these are given simply as a means for clearly describing my invention.

What I claim is:—

1. A stable cold cream consisting of a stabilized emulsion of a natural citrus fruit juice, oxy-cholesterin and an emolient.

2. A stable cold cream consisting of a stabilized emulsion of a natural citrus fruit juice, oxy-cholesterin and petrolatum.

3. In a cosmetic cream, a stabilized emulsion of lemon juice, oxy-cholesterin and an emolient.

4. A stable cold cream consisting of a stabilized emulsion of lemon juice, oxy-cholesterin and petrolatum.

LOUIS J. STERN.